United States Patent

Lautenschläger Horst et al.

[11] Patent Number: 5,505,554
[45] Date of Patent: Apr. 9, 1996

[54] DRAWER FRONT FASTENING HARDWARE

[75] Inventors: Lautenschläger Horst, Reinheim; Gerhard Lautenschläger, Brensbach-Wersau, both of Germany

[73] Assignee: MEPLA-Werke Lautenschläger GmbH & Co. KG, Germany

[21] Appl. No.: 318,875

[22] PCT Filed: Jan. 27, 1994

[86] PCT No.: PCT/EP94/00232

§ 371 Date: Oct. 18, 1994

§ 102(e) Date: Oct. 18, 1994

[87] PCT Pub. No.: WO94/18870

PCT Pub. Date: Sep. 1, 1994

[30] Foreign Application Priority Data

Feb. 19, 1993 [DE] Germany .......................... 43 05 074.3

[51] Int. Cl.$^6$ .................................................. B65D 59/00
[52] U.S. Cl. ............................ 403/12; 403/199; 403/245; 312/348.2; 411/84; 411/551
[58] Field of Search ..................................... 403/230, 231, 403/245, 246, 12, 13, 24, 199, 405.1, 406.1, 407.1, 362, 373, 374; 312/348.2, 348.4; 411/84, 85, 551

[56] References Cited

U.S. PATENT DOCUMENTS

| 3,030,131 | 4/1962 | Scherry | 403/362 |
|---|---|---|---|
| 4,589,793 | 5/1986 | Nilsson et al. | 403/13 |
| 4,666,355 | 5/1987 | Stover | 411/85 |
| 4,840,512 | 6/1989 | Röck et al. | 403/199 X |
| 5,076,723 | 12/1991 | Berger | 403/12 |
| 5,163,774 | 11/1992 | Lautenschläger | 403/345 |
| 5,163,775 | 11/1992 | Rowan, Jr. | 403/362 X |
| 5,207,526 | 5/1993 | Brüstus et al. | 403/245 X |

FOREIGN PATENT DOCUMENTS

| 3415851 | 5/1991 | Germany . | |
| 9109024 | 11/1991 | Germany . | |
| 4026407 | 2/1992 | Germany . | |
| 1567000 | 5/1980 | United Kingdom | 403/231 |
| 2190284 | 11/1987 | United Kingdom | 312/348.2 |

*Primary Examiner*—Kenneth J. Dorner
*Assistant Examiner*—Harry C. Kim

[57] ABSTRACT

Drawer front fastening hardware (10) with a lug (24) which can be fastened to the inside surface of the drawer front and has a vertical slot (26) opening at the bottom end, into which a stud (28) having a tap (30) opening at its end and protruding from the drawer side (14) can be introduced. The stud (28) can be inserted into the slot in the mounting lug (24) and, by tightening a fastening screw (31) provided with a washer (33) and driven into the tap (30), fixed therein, the drawer front (12) being thereby joined to the drawer side (14).

The mounting lug (24) has in its area situated between the slot (26) and the drawer front an elongated recess or groove (40) running parallel to the slot (26) and a ramp (42) in a plane parallel to the drawer bottom from the bottom of the recess at an angle inclined away from the drawer front (12), on which an elongated margin (38) of the washer (33), bent at a complementary angle, is supported.

11 Claims, 2 Drawing Sheets

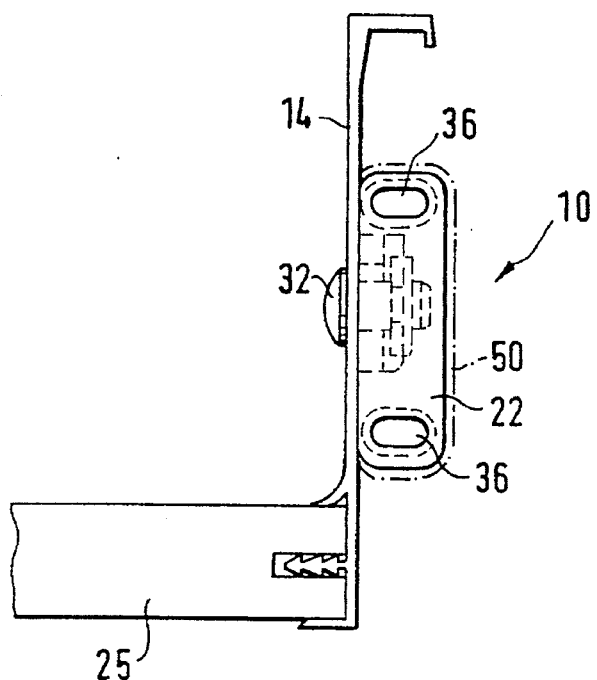
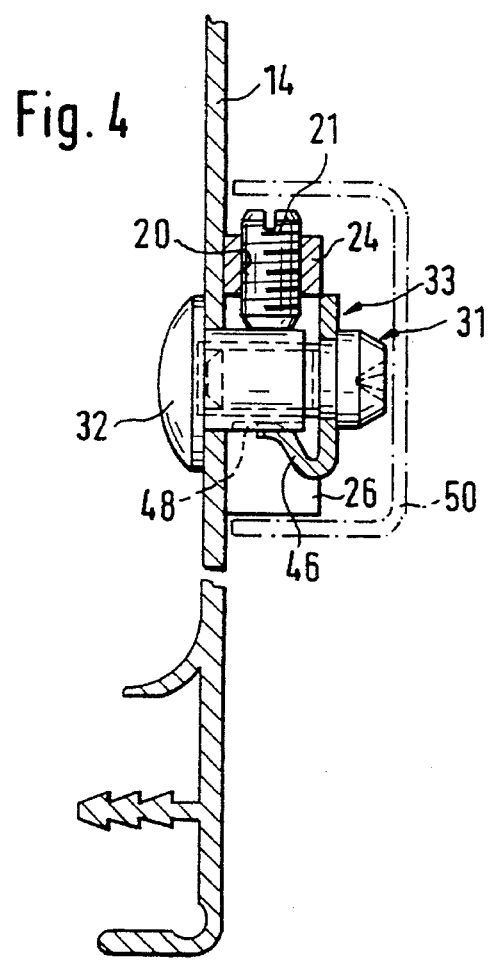
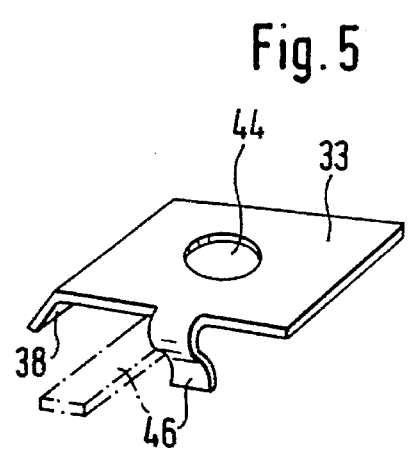

DRAWER FRONT FASTENING HARDWARE

BACKGROUND OF THE INVENTION

The invention relates to a hardware device for the adjustable fastening of a drawer front to its sides, with a fastening member attachable to the drawer front and a mounting member which can be releasably joined to the fastening member and is provided on the corresponding drawer side, the fastening part of which has a fastening lug with flat sides running parallel to the drawer side and projecting substantially at a right angle from the inside surface of the drawer front, in which a slot running perpendicularly and substantially parallel to the inside surface and open at the bottom end is provided, and the mounting member has a mounting stud projecting from the outside surface of the drawer side and having a diameter slightly smaller than the width of the slot measured horizontally, and whose height projecting beyond the outside surface of the drawer side is slightly smaller than the thickness of the fastening lug, a threaded bore being provided in the front end of the mounting stud, into which the shaft of a fastening screw is driven, which can be driven into the stud with a washer disposed on its head into gripping contact of its head with the outside surface of the fastening lug.

Drawers today are mostly provided on their visible front with drawer fronts which overlap the actual drawer box in height and width and which therefore, when in the position fully withdrawn into the corresponding cabinet carcase, lie snugly, like lipped doors, against the carcase; in the case of the top and bottom drawers of a chest of drawers, their projecting top and bottom margins lie against the edges of the carcase. The problem then arises that the drawer fronts have to be aligned with the drawer fronts of laterally or vertically adjacent drawers and/or the cabinet side walls such that, in the closed state, they will have an aesthetically pleasing exact alignment. Whenever false facings were placed on the actual drawer fronts and screwed thereon, such alignment was relatively easy to achieve by making the hole for the screws driven from the inside of the drawer through the drawer front into the drawer facing larger than the shaft of the screws, so that the facing could be shifted by loosening the screws and moving it within the space allowed by the oversized holes. By tightening the screws after completing the alignment, the facings were then affixed to the drawer front. In recent times drawers are increasingly being made without a false facing, i.e., the facings simultaneously constitute the drawer front and therefore they have to be able to be affixed to the drawer box in order to stabilize the drawer at its forward area. On the other hand, however, the described alignment must nevertheless be possible. Mounting hardware of various kinds have been developed for this purpose, some of which additionally serve to mount the front end of the rail of the drawer slide holding the drawer on the cabinet carcase (DE-OS 36 32 442). This mounting hardware is disposed on the inside surface of the drawer side under the drawer bottom. But then, to enable the drawer front to be fastened tightly to the drawer sides—at least in the case of drawers of great vertical depth—additional fastening means in the nature of corner fasteners must be provided above the bottom level, which likewise must permit adjustment of the drawer front and also must be inconspicuous. In recent times, in the case of drawers with hollow sides made of plastic or metal and used for certain applications, mounting hardware disposed inside of the hollow drawer sides has been used for drawer fronts (e.g., EP-OS 0 267 477), in which a mounting member is fastened to the drawer front, which can be hung on a leaf spring which in turn is disposed for adjustment in the vertical and closing direction of the drawer in a supporting member disposed in the interior of the hollow drawer side. For the transverse adjustment of the drawer front, the mounting member itself is again so subdivided that these members are transversely adjustable relative to one another. This known hardware is of relatively complex configuration and is accordingly difficult and expensive to manufacture.

In addition to drawers with sides made from the above-mentioned hollow shapes—for reasons of cost, among others—those made of single-wall extruded aluminum shapes or of sheet metal shapes are also used in the manufacture of drawers in which a concealed arrangement of the drawer front mounting hardware is not possible.

Mounting hardware of the above-mentioned kind has been developed for these applications (DE-OS 40 26 407), the dimensions of which are comparatively small, and it permits the adjustment of the drawer front relative to the drawer sides horizontally and, if necessary, vertically also. For the drawer front, after initial assembly or an adjustment operation, to be drawn tightly against the front edges of the drawer sides and bottom by tightening the screw, the side of the slot in the lug that is remote from the drawer front is provided with a ramp on which the washer provided under the head of the screw is placed. When the screw is tightened after another adjustment, therefore, the wedge effect of this ramp draws the lug and thus the drawer front against the corresponding drawer side. The tightening force is thus produced on the side of the lug remote from the drawer front and through the relatively slender top of the lug where it bridges the end of the slot. Thus a bending moment is produced in this upper part of the lug, which seeks to widen the slot. In an extreme case the lug can even break where it spans the slot, in the case of previous damage or excessive tightening.

The invention, accordingly, is addressed to the problem of proposing a fastening means for the fronts of drawers, which will enable drawer fronts to be fastened tightly, but adjustably in the necessary coordinate directions, either to single-wall drawer sides of metal or to wooden drawer sides, and will provide greater strength than the known hardware without being of greater size or complexity. Furthermore, the setting of the level of the drawer front relative to the drawer sides or bottom of the drawer is to be secured not only by the clamping action of the mounting screw but also by the interlocking of the hardware members with one another.

Setting out from hardware of the kind described above, this problem is solved in accordance with the invention by providing the mounting lug in its area between the slot and the drawer front, with a groove running parallel to the slot and having a ramp surface running parallel to the seat and sloping—seen in a plane parallel to the drawer bottom away from the drawer front and from the corresponding drawer-side, on which an elongate margin of the washer, bent at a complementary angle, is supported. The force drawing the drawer front against the corresponding drawer side is thus produced in the area located between the slot and the drawer front by the wedging action produced by tightening the screw between the ramp and the elongate margin of the washer, so that the cross section of the lug's bridge portion spanning the upper end of the slot is completely relieved of stress.

To enable the said wedging action between the ramp of the groove in the lug to be produced in the mounting lug and in the bent margin of the washer, the horizontal distance 'A', measured from the longitudinal central plane of the slot in the mounting lug to the upper edge of the ramp sloping away from the bottom of the groove, is slightly greater than the distance 'a' measured from the central axis of the screw hole in the washer to its bent elongate margin, this distance 'a' being measured on the bottom of the washer facing the mounting lug.

To secure the setting of the level of the drawer front, there is provided, in further development of the invention, in the area of the lug spanning the upper end of the slot, a threaded bore passing from the top boundary surface all the way into the slot, in which the shaft of a level adjusting screw provided with a complementary thread is engaged with its extremity pointing toward the slot and thrusting against the stud of the mounting part. By rotating the level setting screw clockwise or counterclockwise the free end of the shaft of the mounting screw is driven in or out of the slot and then forms an abutment for the mounting stud. Accidental dropping of the drawer front when the mounting screw is loosened is therefore impossible.

To secure the bent margin of the washer in correct alignment with the ramp in the groove in the lug when the drawer front is installed on the drawer side, i.e., when the mounting stud is inserted into the slot in the mounting lug, it is desirable that the washer be nonrotatable with respect to its alignment with the mounting stud, and instead that it be held displaceably in the direction of its longitudinal central axis on the mounting member and drawer side.

The washer preferably has a square or rectangular shape with the elongate, bent margin on one side, and then on the side of the washer adjoining it at right angles and facing the bottom, open end of the slot when it is in the proper mounting position, a tongue is provided projecting toward the drawer side, which can be displaced lengthwise in an opening or groove in the drawer side or in the mounting stud.

Preferably, the tongue engages a longitudinal groove made in the circumferential surface of the mounting stud.

To be able to install the lug on the mounting stud even if the mounting screw is only slightly loosened, an embodiment is recommended in which the groove is open at its bottom end in the bottom boundary surface of the lug.

The mounting lug is best provided, as in the known hardware, on a mounting flange in which at least one hole is provided for each screw that can be driven into the drawer front, these holes being best in the form of horizontal slots, thereby permitting a transverse adjustment of the drawer front within the range permitted by the slots.

The most rigid and strong fastening of the stud to the drawer side is preferably achieved if a hole complementary to the stud is made through the drawer side, in which case a flange of greater diameter is then provided on the drawer-side end of the stud. When the stud is in the proper position for fastening to the drawer side, this flange will then lie against the inside surface of the corresponding drawer side and secure the stud against withdrawal from the corresponding hole in the drawer side. The securing of the stud in the opposite direction, i.e., against any forcing of the stud toward the drawer interior, can be accomplished either by an appropriately tight fit of the stud in the associated hole in the drawer side, or, in the case of drawer sides made from sheet metal, by any additional method, such as welding, soldering or even peening.

After the drawer front has been fastened to the drawer box in the correct position, a cover can be placed onto the hardware assembly. This cover can be made of thin plastic and made so as to be snapped onto it, since it has no need to withstand any fastening forces.

BRIEF DESCRIPTION OF THE DRAWINGS

The invention is further explained in the description that follows of an embodiment, in conjunction with the drawing, wherein:

FIG. 3 is a view of the hardware part mounted on the drawer side, seen in the direction indicated by the arrows 3—3 in FIG. 1;

FIG. 4 is a sectional view along the arrows 4—4 in FIG. 2, and

FIG. 5 is a perspective view of the bottom plate which transfers the pressure from the fastening screw to the fastening lug.

DETAILED DESCRIPTION OF THE INVENTION

Figure 1:
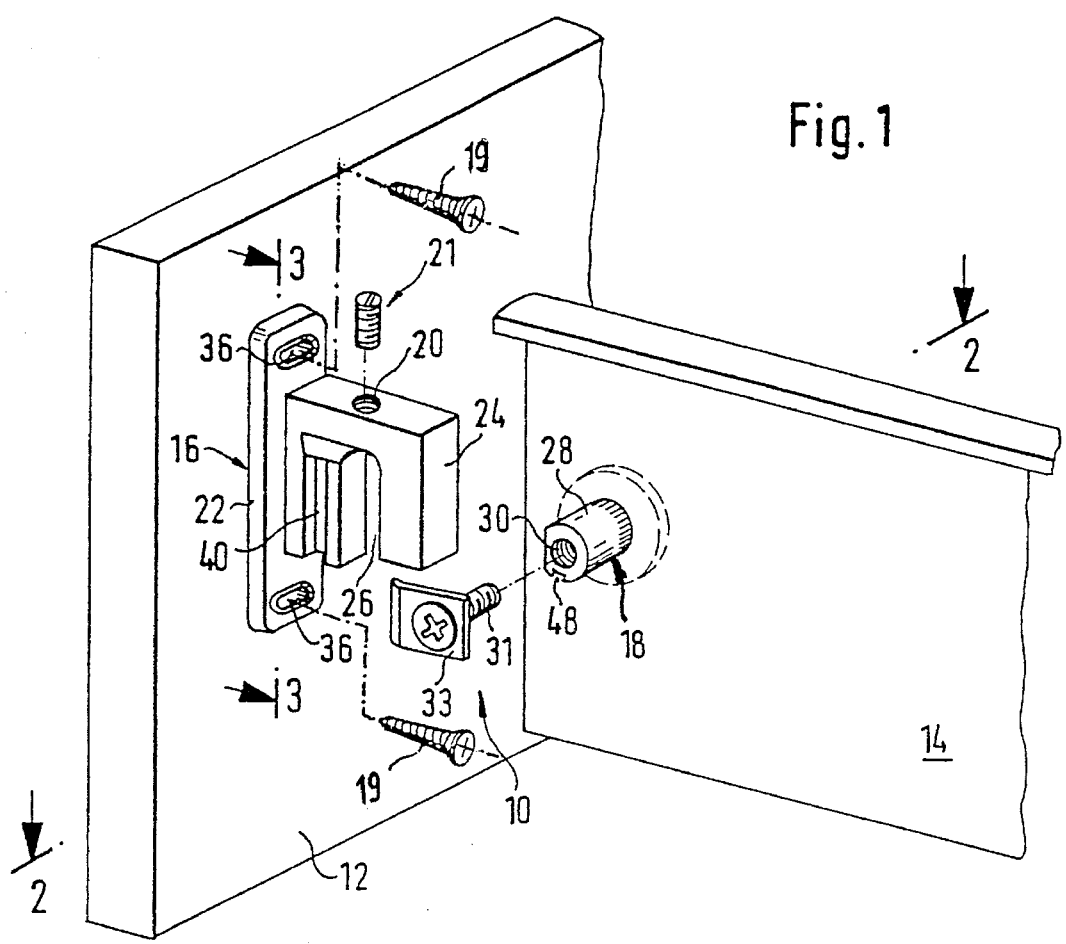
FIG. 1 is an exploded perspective view showing a corner section of the drawer front and the front end of the corresponding drawer side, each with its part of the hardware.
Figure 2:
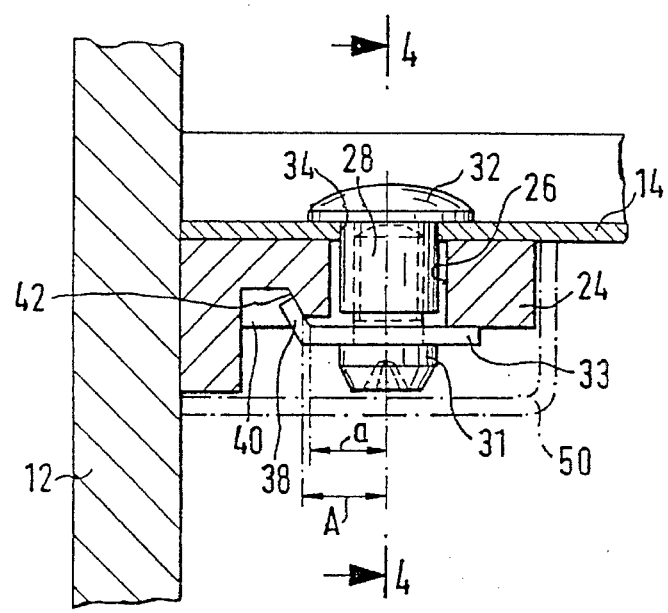
FIG. 2 is a sectional view of the installed hardware part seen in the direction of arrows 2—2 in FIG. 1.

In FIG. 1 there is shown an embodiment, identified as a whole by 10, of fastening hardware according to the invention, only the corner area of the drawer front 12 to be fastened to the drawer being shown, plus the end of the drawer side 14 (in this case formed by a metal plate). The hardware assembly 10 has a mounting member 16 which can be affixed to the inside face of the drawer front 12, and a stud member 18 which can be fastened to the drawer side 14. The mounting member 16 is composed of a mounting flange 22 which can be fastened by means of screws 19 onto the inside face of the drawer front, and a flat lug 24 projecting approximately centrally and at right angles to the inside face. The attachment of the mounting member 16 to the inside face of the drawer front is performed such that the flat side of the lug 24 is at right angles to the drawer front's inside face and to the drawer bottom 25 (FIG. 3). The lug 24 has a slot 26 open at one end in the bottom edge and running parallel at a distance from the inside face of the drawer front; this slot is hooked over a stud 28 of stud member 18 projecting from the drawer side 14. In the stud 28 there is provided a tap 30 in its exposed end face, into which the matingly threaded shaft of a screw 31 can be driven, under the head of which a square or rectangular washer 33 is held, which can be rotated but cannot escape. The stud member 18 has at its other face, i.e., the one opposite the mouth of the tap 30, an integrally formed head 32 (FIGS. 2 to 4). The stud member is fastened on or in the drawer side 14 in an aperture 34 in the drawer side, whose cross section is made to correspond to the cross section of the stud 28, the fit between the stud 28 and the opening 34 being selected such that the stud will be held by a press fit when it is pressed into the opening 34. Additional fixation of the stud member 18 by welding or soldering flange 32 to the drawer side 14 or by peening the stud 38 against the surrounding material of the drawer side is possible, but unnecessary, as a rule.

The mounting flange 22 of the mounting member 16 has in its upper and lower ends extending beyond the mounting lug 24 (countersunk) slots 36 running horizontally, which permit the fastener member to be fastened in different horizontal positions on the inside face of the drawer front 12. When the screws 19 in slots 36 are loosened, the drawer front 12 can be shifted transversely relative to the mounting member 16 thus permitting the adjustment of the drawer front in the horizontal direction.

Adjusting the drawer front vertically at right angles thereto is performed by setting the lug 24 at appropriately selected levels on the stud 28, whose length projecting from the drawer side is slightly smaller than the thickness of the lug, so that the tightening force of the fastening screw 31 against the outside face of the lug 24 through the washer 33 when the screw 31 is tightened will result in a firm pressure of the lug 24 against the drawer side 14. In order then to secure a selected level of the stud member 18 in the slot 26 even if the screw 31 should loosen accidentally in the course of time, a tap 20 passing all the way from the top of the lug to the slot 26 is provided in the area where the slot 26 terminates, into which a set screw 21 provided with a matching thread can be driven. Depending on the depth to which the set screw is driven, its front end will remain within the tap 20 or will protrude therefrom into the slot 26 and then form an abutment for the stud 28. The set screw 21 with its lower end will thus form an abutment which is adjustable in the longitudinal direction of the slot 26, permitting the drawer front 12 to be locked at a selected height.

From the margin of the washer 33 on the drawer front side a washer extension 38 is bent at an angle toward the drawer side 14. This washer extension 38 engages a groove 40 running parallel to the slot 26 in the flat side of the lug 24 that faces away from the drawer side. The groove 40 is open at its bottom end the same as the slot 26. The wall of the groove 40 adjacent the slot is inclined toward the slot which is complementary to the washer extension. It is now clear that, when the screw 31 is tightened, the bottom of the washer 33 will be forced against the confronting flat side of the lug 24, while at the same time the washer extension 38 will engage the side of the groove 40. By the appropriate selection of the dimensions of the washer 33 and of the distance between the groove side and the longitudinal central plane of the slot 26, contact will be made by the washer extension 38 with the side of the groove 40 before the bottom of the flat portion of the washer 33 comes in contact with the flat side of the lug 24, which is set back slightly between the slot 26 and the groove 40. In this manner it is possible for the tightening force exerted by the head of screw 21 through washer 33 against the lug 24 to produce a wedge effect between the bent margin 38 and the ramp 42, which not only forces the lug tightly against the drawer side 14, but also produces a component of force which draws the drawer front 12 against the front end of the drawer side 14.

The size of the washer 33 with respect to the top edge of the ramp 42 which produces this tightening is selected such that the distance 'A' from the longitudinal central plane of the slot 26 to the top edge of the ramp 42 is slightly greater than the distance 'a' from the central axis of the hole 44 in the washer at its bottom to the apex of the bend in the washer extension 38 (FIG. 2).

The washer 33, as mentioned above, is held rotatably and undisplaceably lengthwise under the head of the screw 31, so that the screw can be tightened without causing the washer to rotate with it. This rotatable mounting on the screw has, however, the disadvantage that when the drawer front 12 is attached to a drawer side and the washer contacts the lug, the washer can be turned away from the required alignment of the washer extension 38 with the ramp 42, so that then the washer extension 38 cannot be set into the groove 40 until the washer has been turned back by hand to the required alignment. In the embodiment represented in the drawing figures, therefore, the washer 33 is also provided with means to prevent it from turning, which consists in adding a tongue 46 on the bottom horizontal margin of the washer 33, i.e., when the washer is in the properly installed position, which points toward the drawer side and inwardly toward the stud 28 and fits in a groove 48. This assures that the washer 33 is rotatable on the shaft of the screw 31 but cannot rotate relative to the stud 28, but is guided in groove 48 for displacement lengthwise.

The guiding tongue 46 is most simply made by bending accordingly a tab made integral with the washer, as shown also in broken lines in its original position.

In FIGS. 2 to 4 it can also be seen that the hardware assembly 10, after the drawer front is correctly aligned and fastened to the drawer side 14, is covered by a cap 50 shown in broken lines in those figures. This cap itself does not serve any fastening purpose but serves only to conceal the hardware. It can therefore be made cheaply of plastic, and can be fastened in place by snapping it onto the mounting flange 22 of the hardware member 16.

We claim:

1. A hardware assembly for the adjustable fastening of a drawer front to a drawer side to form a drawer having an interior, the assembly comprising a mounting member attachable to an inside face of the drawer front, the mounting member being in the form of a downwardly. projecting hook, the hook comprising a first arm located toward the drawer front and running parallel to both of the drawer side and the drawer front when in the properly installed position, a second arm projecting from an upper end of the first arm in a direction perpendicular to the drawer front and parallel to the drawer side when in the properly installed position, and a third arm extending downwardly from a projecting end of the second arm and parallel to the first arm to form the hook with the first and second arms, the hook having a slot formed between the first and third arms which slot opens out at a bottom end thereof, a mounting stud attachable to the drawer side and projecting therefrom in the properly installed position, the mounting stud having a threaded bore therethrough opening out of an end face of the mounting stud, the diameter of the mounting stud being slightly smaller than the width of the slot of the hook measured in a direction perpendicular to the drawer front, the length of a mounting stud portion projecting from the drawer side being smaller than the width of the hook measured in a direction parallel to the drawer front, a fastening screw receivable in the threaded bore of the mounting stud, the fastening screw having a washer rotatable with respect to a shaft of the fastening screw for effecting gripping contact between the mounting stud and the hook by way of an outside face of the hook facing away from the drawer side when in the properly installed position such that mounting stud resides within the slot, the fastening screw is retainingly received in the threaded bore of the mounting stud, and the washer resides between a head of the fastening screw and the outside face of the hook, the washer having an elongate extension positioned at a first angle, and the washer having a hole for allowing passage therethrough of the shaft of the fastening screw, the first arm of the hook having on its outside face a groove running parallel to the slot, the groove having a ramp surface running parallel to the plane of the slot and extending from the groove at a second angle away from the drawer front and drawer side, the second angle of the ramp and the first angle of the washer extension being essentially complementary, wherein when the assembly is properly installed, the washer extension resides within the groove forcibly against the ramp thereof when the fastening screw is tightened.

2. The assembly of claim 1, wherein a horizontal distance (A), measured from a longitudinal central plane of the slot to an upper edge of the ramp remote from a bottom of the groove, is slightly greater than a horizontal distance (a), measured from the center of the washer hole to an inside of the washer extension positioned at the first angle.

3. The assembly of claim 1, wherein a threaded tap is provided through an upper face of the second arm of the hook and opening into the slot, into which tap a level adjusting screw can engagingly thread such that an end of the screw can pass into the slot to abuttingly thrust against a top side of the mounting stud.

4. The assembly of claim 1, wherein the washer, when tightened against the ramp by way of the elongate extension is held against rotation about a longitudinal central axis of the mounting stud, while being displaceable longitudinally along the groove.

5. The assembly of claim 4, wherein the washer has a substantially rectangular or square shape, the elongate extension being provided on a first lateral side of the washer, and wherein a second lateral side of the washer adjacent the first side, which in the properly installed position the second side faces the open bottom end of the slot, has a guiding tongue projecting toward the drawer side when in the properly installed position, which guiding tongue engages lengthwise displaceably in a longitudinal opening or recess in an outside surface of the stud member.

6. The assembly of claim 1, wherein the groove on the hook opens at its bottom end coextensive with a bottom boundary surface of the first arm of the hook.

7. The assembly of claim 1, wherein the hook projects from a mounting flange in which at least one through opening is provided for a mounting screw that can be driven into the drawer front.

8. The assembly of claim 7, wherein the at least one through opening has the shape of a slot running horizontally in the properly installed position.

9. The assembly of claim 1, wherein the stud member is fashioned to pass through a conforming opening in the drawer side.

10. The assembly of claim 9, wherein the stud member has a flange of enlarged diameter provided on its drawer-side end.

11. The assembly of claim 1, further comprising a a cap for covering the entire assembly, which cap is installable after a mounting connection between the mounting member and the stud member has been made.

* * * * *

UNITED STATES PATENT AND TRADEMARK OFFICE
CERTIFICATE OF CORRECTION

PATENT NO.    :   5,505,554
DATED         :   April 9, 1996
INVENTOR(S)   :   Horst Lautenschläger and Gerhard Lautenschläger It is certified that an error appears in the above-identified patent and that said Letters Patent is hereby corrected as shown below:

On the title page item [75] should read as follows:

[75] Inventors: Horst Lautenschläger, Reinheim;
               Gerhard Lautenschläger, Brensbach-Wersau, both of Germany On the title page item [19] shoulr read "Lautenschläger et al."

Signed and Sealed this

Sixteenth Day of July, 1996

Attest:

BRUCE LEHMAN

Attesting Officer

Commissioner of Patents and Trademarks